US012148370B2

(12) United States Patent
Wang et al.

(10) Patent No.: US 12,148,370 B2
(45) Date of Patent: Nov. 19, 2024

(54) DEVICES WITH DISPLAYS HAVING TRANSPARENT OPENINGS AND UNIFORMITY CORRECTION

(71) Applicant: Apple Inc., Cupertino, CA (US)

(72) Inventors: Lingtao Wang, Cupertino, CA (US); Yingying Tang, Cupertino, CA (US); Scott R. Johnston, Sunnyvale, CA (US); Chaohao Wang, Shanghai (CN); Sheng Zhang, San Jose, CA (US); Woo Shik Jung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/481,119

(22) Filed: Oct. 4, 2023

(65) Prior Publication Data

US 2024/0038158 A1 Feb. 1, 2024

Related U.S. Application Data

(63) Continuation of application No. 17/368,548, filed on Jul. 6, 2021, now Pat. No. 11,823,620.

(60) Provisional application No. 63/062,097, filed on Aug. 6, 2020.

(51) Int. Cl.
*G09G 3/3225* (2016.01)

(52) U.S. Cl.
CPC ... *G09G 3/3225* (2013.01); *G09G 2300/0443* (2013.01); *G09G 2320/0233* (2013.01); *G09G 2320/0673* (2013.01); *G09G 2360/144* (2013.01)

(58) Field of Classification Search
CPC ......... G09G 3/3225; G09G 2320/0233; G09G 2300/0465; G09G 2360/16; G09G 2310/0232
See application file for complete search history.

(56) References Cited

U.S. PATENT DOCUMENTS

| | | | |
|---|---|---|---|
| 7,355,606 | B2 | 4/2008 | Paquette |
| 9,098,136 | B2 | 8/2015 | Kim |
| 10,268,884 | B2 | 4/2019 | Jones et al. |
| 2014/0375704 | A1 | 12/2014 | Bi et al. |
| 2017/0116934 | A1 | 4/2017 | Tien et al. |
| 2020/0234634 | A1 | 7/2020 | Li |

(Continued)

*Primary Examiner* — Dennis P Joseph
(74) *Attorney, Agent, or Firm* — Treyz Law Group, P.C.; Joseph F. Guihan; Jinie M. Guihan

(57) ABSTRACT

An electronic device may include a display and an optical sensor formed underneath the display. The electronic device may include a plurality of transparent windows that overlap the optical sensor. The resolution of the display panel may be reduced in some areas due to the presence of the transparent windows. To prevent a visible border between the reduced resolution areas of the display and full resolution areas of the display, uniformity compensation circuitry may be used to compensate pixel data. The uniformity compensation circuitry may output compensated pixel data for the display using one or more compensation maps that include compensation factors associated with pixel locations. The uniformity compensation circuitry may also use region-specific gamma look-up tables to apply different gamma curves to pixels in different regions of the display. The uniformity compensation circuitry may also be used to form a transition region between different regions of the display.

20 Claims, 11 Drawing Sheets

(56) References Cited

U.S. PATENT DOCUMENTS

| | | | | |
|---|---|---|---|---|
| 2020/0294450 | A1 | 9/2020 | Kim et al. | |
| 2020/0394964 | A1 | 12/2020 | Hyun et al. | |
| 2021/0241671 | A1* | 8/2021 | Lee ...................... | G09G 3/2003 |
| 2021/0343222 | A1* | 11/2021 | Hei ...................... | G09G 3/3233 |
| 2021/0358379 | A1 | 11/2021 | Li et al. | |

* cited by examiner

DEVICES WITH DISPLAYS HAVING TRANSPARENT OPENINGS AND UNIFORMITY CORRECTION

This application is a continuation of non-provisional patent application Ser. No. 17/368,548, filed Jul. 6, 2021, which claims the benefit of provisional patent application No. 63/062,097, filed Aug. 6, 2020, which are hereby incorporated by reference herein in their entireties.

BACKGROUND

This relates generally to electronic devices, and, more particularly, to electronic devices with displays.

Electronic devices often include displays. For example, an electronic device may have an organic light-emitting diode (OLED) display based on organic light-emitting diode pixels. In this type of display, each pixel includes a light-emitting diode and thin-film transistors for controlling application of a signal to the light-emitting diode to produce light. The light-emitting diodes may include OLED layers positioned between an anode and a cathode.

There is a trend towards borderless electronic devices with a full-face display. These devices, however, may still need to include sensors such as cameras, ambient light sensors, and proximity sensors to provide other device capabilities. Since the display now covers the entire front face of the electronic device, the sensors will have to be placed under the display stack. In practice, however, the amount of light transmission through the display stack is very low (i.e., the transmission might be less than 20% in the visible spectrum), which severely limits the sensing performance under the display.

It is within this context that the embodiments herein arise.

SUMMARY

An electronic device may include a display and an optical sensor formed underneath the display. The electronic device may include a plurality of non-pixel regions that overlap the optical sensor. Each non-pixel region may be devoid of thin-film transistors and other display components. The plurality of non-pixel regions is configured to increase the transmittance of light through the display to the sensor. The non-pixel regions may therefore be referred to as transparent windows in the display.

The resolution of the display panel may be reduced in some areas due to the presence of the transparent windows. To prevent a visible border between the reduced resolution areas of the display and full resolution areas of the display, uniformity compensation circuitry may be used to compensate pixel data.

Uniformity compensation circuitry may receive input pixel data having gray levels for each pixel in the display. The uniformity compensation circuitry may output compensated pixel data for the display. The uniformity compensation circuitry may use one or more compensation maps that include compensation factors associated with pixel locations. The uniformity compensation circuitry may also use region-specific gamma look-up tables to apply different gamma curves to pixels in different regions of the display.

The uniformity compensation circuitry may also be used to form a transition region adjacent to a boundary between a pixel removal region of the display and a full pixel density region of the display. The maximum luminance of pixels may gradually be changed across the transition region.

DETAILED DESCRIPTION

Figure 1:
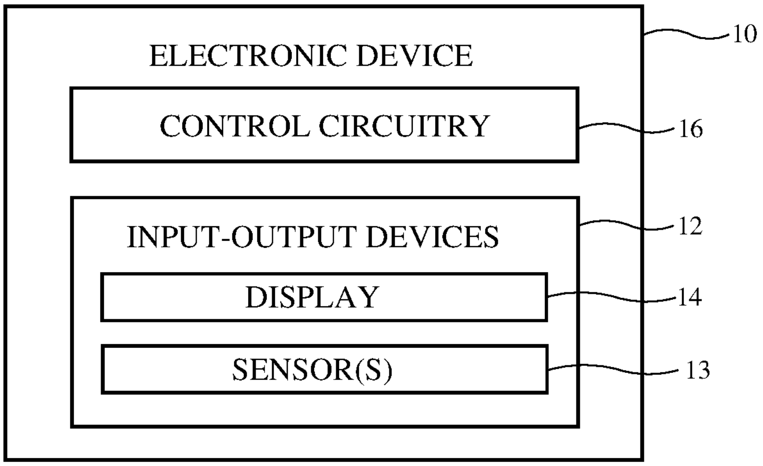
FIG. 1 is a schematic diagram of an illustrative electronic device having a display and one or more sensors in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Input-output devices 12 may also include one or more sensors 13 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 13 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 13 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Display 14 may be an organic light-emitting diode display or may be a display based on other types of display technology (e.g., liquid crystal displays). Device configurations in which display 14 is an organic light-emitting diode display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
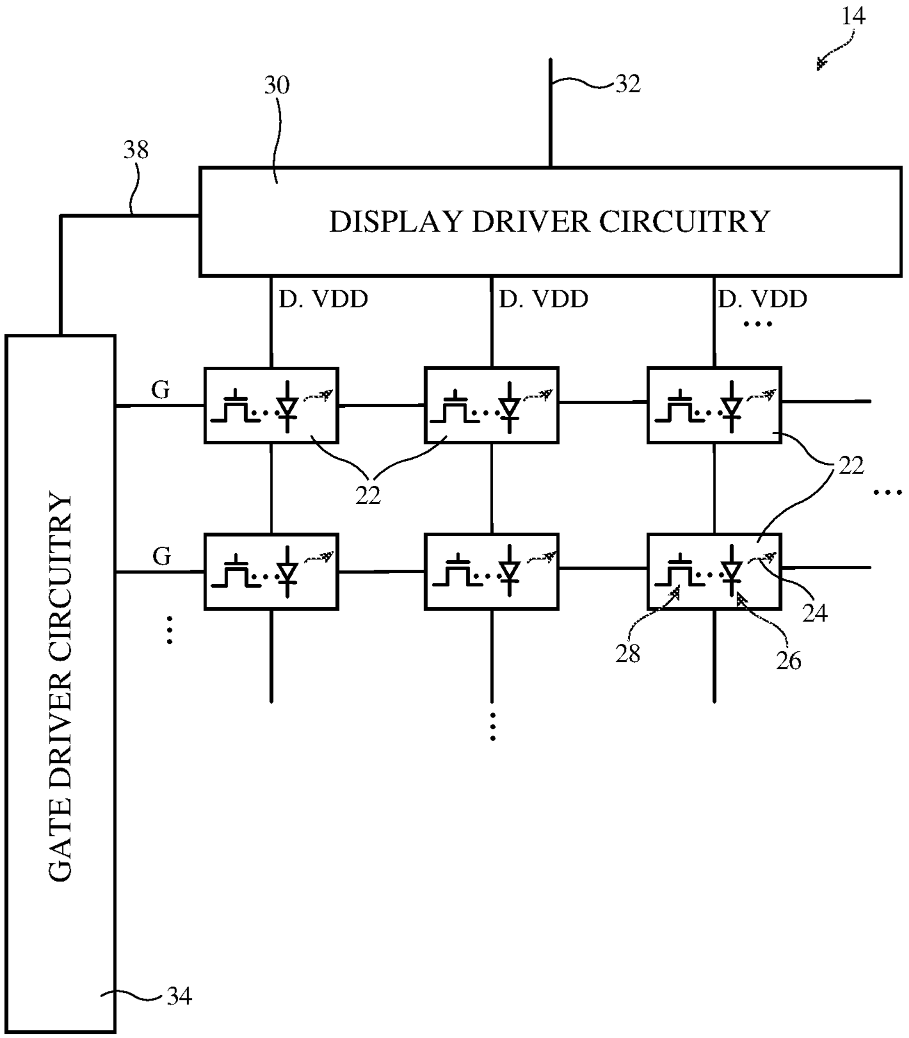
FIG. 2 is a schematic diagram of an illustrative display with light-emitting elements in accordance with an embodiment.

A top view of a portion of display 14 is shown in FIG. 2. As shown in FIG. 2, display 14 may have an array of pixels 22 formed on a substrate. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may include a light-emitting diode 26 that emits light 24 under the control of a pixel control circuit formed from thin-film transistor circuitry such as thin-film transistors 28 and thin-film capacitors. Thin-film transistors 28 may be polysilicon thin-film transistors, semiconducting-oxide thin-film transistors such as indium zinc gallium oxide (IGZO) transistors, or thin-film transistors formed from other semiconductors. Pixels 22 may contain light-emitting diodes of different colors (e.g., red, green, and blue) to provide display 14 with the ability to display color images or may be monochromatic pixels.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply display driver circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14.

Gate driver circuitry 34 (sometimes referred to as row control circuitry) may be implemented as part of an integrated circuit and/or may be implemented using thin-film transistor circuitry. Horizontal control lines G in display 14 may carry gate line signals such as scan line signals, emission enable control signals, and other horizontal control signals for controlling the display pixels 22 of each row. There may be any suitable number of horizontal control signals per row of pixels 22 (e.g., one or more row control signals, two or more row control signals, three or more row control signals, four or more row control signals, etc.).

The region on display 14 where the display pixels 22 are formed may sometimes be referred to herein as the active area. Electronic device 10 has an external housing with a peripheral edge. The region surrounding the active area and within the peripheral edge of device 10 is the border region. Images can only be displayed to a user of the device in the active region. It is generally desirable to minimize the border region of device 10. For example, device 10 may be provided with a full-face display 14 that extends across the entire front face of the device. If desired, display 14 may also wrap around over the edge of the front face so that at least part of the lateral edges or at least part of the back surface of device 10 is used for display purposes.

Figure 3:
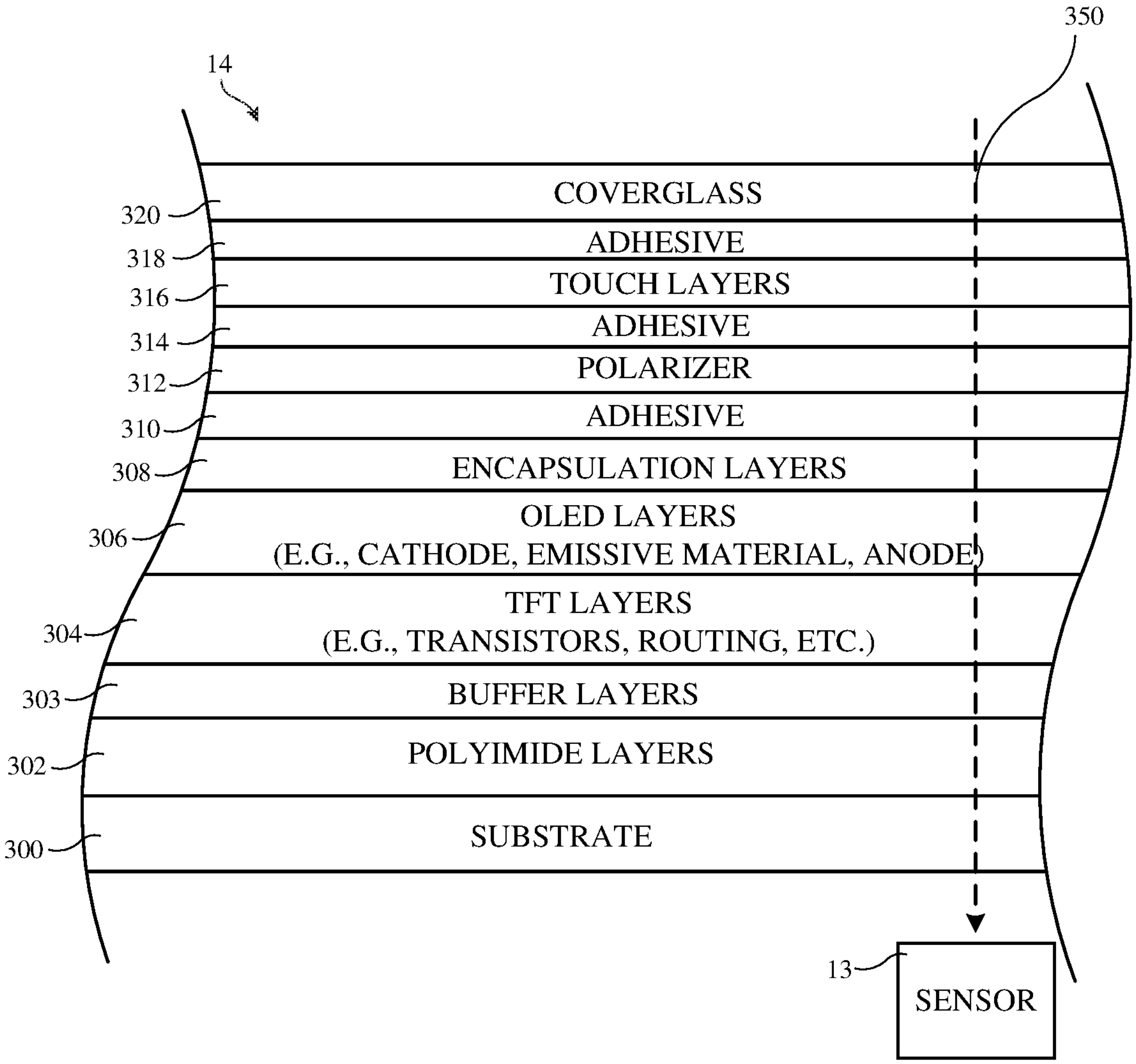
FIG. 3 is a cross-sectional side view of an illustrative display stack that at least partially covers a sensor in accordance with an embodiment.

Device 10 may include a sensor 13 mounted behind display 14 (e.g., behind the active area of the display). FIG. 3 is a cross-sectional side view of an illustrative display stack of display 14 that at least partially covers a sensor in accordance with an embodiment. As shown in FIG. 3, the display stack may include a substrate such as substrate 300. Substrate 300 may be formed from glass, metal, plastic, ceramic, sapphire, or other suitable substrate materials. In some arrangements, substrate 300 may be an organic substrate formed from polyethylene terephthalate (PET) or polyethylene naphthalate (PEN) (as examples). One or more polyimide (PI) layers 302 may be formed over substrate 300. The polyimide layers may sometimes be referred to as an organic substrate (e.g., substrate 300 is a first substrate layer and substrate 302 is a second substrate layer). The surface of substrate 302 may optionally be covered with one or more buffer layers 303 (e.g., inorganic buffer layers such as layers of silicon oxide, silicon nitride, amorphous silicon, etc.).

Thin-film transistor (TFT) layers 304 may be formed over inorganic buffer layers 303 and organic substrates 302 and 300. The TFT layers 304 may include thin-film transistor circuitry such as thin-film transistors, thin-film capacitors, associated routing circuitry, and other thin-film structures formed within multiple metal routing layers and dielectric layers. Organic light-emitting diode (OLED) layers 306 may be formed over the TFT layers 304. The OLED layers 306 may include a diode cathode layer, a diode anode layer, and emissive material interposed between the cathode and anode layers. The OLED layers may include a pixel definition layer that defines the light-emitting area of each pixel. The TFT circuitry in layer 304 may be used to control an array of display pixels formed by the OLED layers 306.

Circuitry formed in the TFT layers 304 and the OLED layers 306 may be protected by encapsulation layers 308. As an example, encapsulation layers 308 may include a first inorganic encapsulation layer, an organic encapsulation layer formed on the first inorganic encapsulation layer, and a second inorganic encapsulation layer formed on the organic encapsulation layer. Encapsulation layers 308 formed in this way can help prevent moisture and other potential contaminants from damaging the conductive circuitry that is covered by layers 308. Substrate 300, polyimide layers 302, buffer layers 303, TFT layers 304, OLED layers 306, and encapsulation layers 308 may be collectively referred to as a display panel.

One or more polarizer films 312 may be formed over the encapsulation layers 308 using adhesive 310. Adhesive 310 may be implemented using optically clear adhesive (OCA) material that offer high light transmittance. One or more touch layers 316 that implement the touch sensor functions of touch-screen display 14 may be formed over polarizer films 312 using adhesive 314 (e.g., OCA material). For example, touch layers 316 may include horizontal touch sensor electrodes and vertical touch sensor electrodes collectively forming an array of capacitive touch sensor electrodes. Lastly, the display stack may be topped off with a cover glass layer 320 (sometimes referred to as a display cover layer 320) that is formed over the touch layers 316 using additional adhesive 318 (e.g., OCA material). display cover layer 320 may be a transparent layer (e.g., transparent plastic or glass) that serves as an outer protective layer for display 14. The outer surface of display cover layer 320 may form an exterior surface of the display and the electronic device that includes the display.

Still referring to FIG. 3, sensor 13 may be formed under the display stack within the electronic device 10. As described above in connection with FIG. 1, sensor 13 may be an optical sensor such as a camera, proximity sensor, ambient light sensor, fingerprint sensor, or other light-based sensor. In such scenarios, the performance of sensor 13 depends on the transmission of light traversing through the display stack, as indicated by arrow 350. A typical display stack, however, has fairly limited transmission properties. For instance, more than 80% of light in the visible and infrared light spectrum might be lost when traveling through the display stack, which makes sensing under display 14 challenging.

Each of the multitude of layers in the display stack contributes to the degraded light transmission to sensor 13. In particular, the dense thin-film transistors and associated routing structures in TFT layers 304 of the display stack contribute substantially to the low transmission. In accordance with an embodiment, at least some of the display pixels may be selectively removed in regions of the display stack located directly over sensor(s) 13. Regions of display 14 that at least partially cover or overlap with sensor(s) 13 in which at least a portion of the display pixels have been removed are sometimes referred to as pixel removal regions or pixel free regions. Removing display pixels (e.g., removing transistors and/or capacitors associated with one or more sub-pixels) in the pixel free regions can drastically help increase transmission and improve the performance of the under-display sensor 13. In addition to removing display pixels, portions of additional layers such as polyimide layers 302 and/or substrate 300 may be removed for additional transmission improvement. Polarizer 312 may also be bleached for additional transmission improvement.

Figure 4:
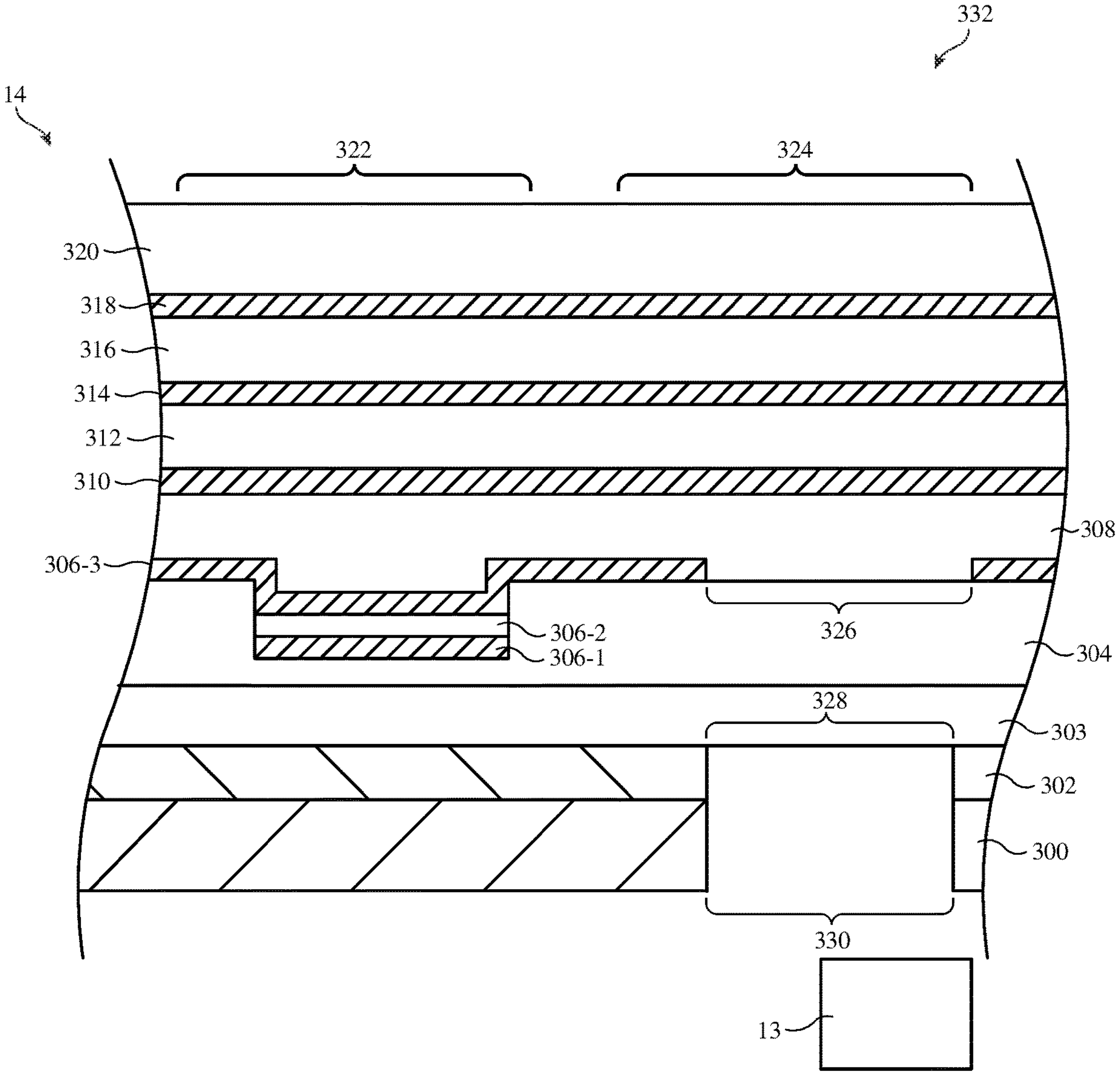
FIG. 4 is a cross-sectional side view of an illustrative display stack with a pixel removal region that includes an opening in a substrate layer in accordance with an embodiment.

FIG. 4 is a cross-sectional side view of an illustrative pixel removal region of a display showing how pixels may be removed to increase transmission through the display. As shown in FIG. 4, display 14 may include a pixel removal region 332 (sometimes referred to as reduced pixel density region 332, low pixel density region 332, etc.). The pixel removal region may include some pixels (e.g., in pixel region 322) and some areas with removed components for increased transmittance (e.g., opening 324). Opening 324 has a higher transmittance than pixel region 322. Opening 324 may sometimes be referred to as high-transmittance area 324, window 324, display opening 324, display window 324, pixel-devoid region 324, etc. In the pixel region 322, the display may include a pixel formed from emissive material 306-2 that is interposed between an anode 306-1 and a cathode 306-3. Signals may be selectively applied to anode 306-1 to cause emissive material 306-2 to emit light for the pixel. Circuitry in thin-film transistor layer 304 may be used to control the signals applied to anode 306-1.

In display window 324, anode 306-1 and emissive material 306-2 may be omitted. Without the display window, an additional pixel may be formed in area 324 adjacent to the pixel in area 322 (according to the pixel pattern). However, to increase the transmittance of light to sensor 13 under the display, the pixel(s) in area 324 are removed. The absence of emissive material 306-2 and anode 306-1 may increase the transmittance through the display stack. Additional circuitry within thin-film transistor layer 304 may also be omitted in pixel removal area to increase transmittance.

Additional transmission improvements through the display stack may be obtained by selectively removing additional components from the display stack in high-transmittance area 324. As shown in FIG. 4, a portion of cathode 306-3 may be removed in high-transmittance area 324. This results in an opening 326 in the cathode 306-3. Said another way, the cathode 306-3 may have conductive material that defines an opening 326 in the pixel removal region. Removing the cathode in this way allows for more light to pass through the display stack to sensor 13. Cathode 306-3 may be formed from any desired conductive material. The cathode may be removed via etching (e.g., laser etching or plasma etching). Alternatively, the cathode may be patterned to have an opening in pixel removal region 324 during the original cathode deposition and formation steps.

Polyimide layers 302 may be removed in high-transmittance area 324 in addition to cathode layer 306-3. The removal of the polyimide layers 302 results in an opening 328 in the pixel removal region. Said another way, the polyimide layer may have polyimide material that defines an opening 328 in the pixel removal region. The polyimide layers may be removed via etching (e.g., laser etching or plasma etching). Alternatively, the polyimide layers may be patterned to have an opening in high-transmittance area 324 during the original polyimide formation steps. Removing the polyimide layer 302 in high-transmittance area 324 may result in additional transmittance of light to sensor 13 in high-transmittance area 324.

Substrate 300 may be removed in high-transmittance area 324 in addition to cathode layer 306-3 and polyimide layer 302. The removal of the substrate 300 results in an opening 330 in the pixel removal region. Said another way, the substrate 300 may have material (e.g., PET, PEN, etc.) that defines an opening 330 in the pixel removal region. The substrate may be removed via etching (e.g., with a laser). Alternatively, the substrate may be patterned to have an opening in high-transmittance area 324 during the original substrate formation steps. Removing the substrate 300 in high-transmittance area 324 may result in additional transmittance of light to sensor 13 in high-transmittance area 324. The polyimide opening 328 and substrate opening 330 may be considered to form a single unitary opening. When removing portions of polyimide layer 302 and/or substrate 300, inorganic buffer layers 303 may serve as an etch stop for the etching step. Openings 328 and 330 may be filled with air or another desired transparent filler.

In addition to having openings in cathode 306-3, polyimide layers 302, and/or substrate 300, the polarizer 312 in the display may be bleached for additional transmittance in the pixel removal region.

Figure 5:
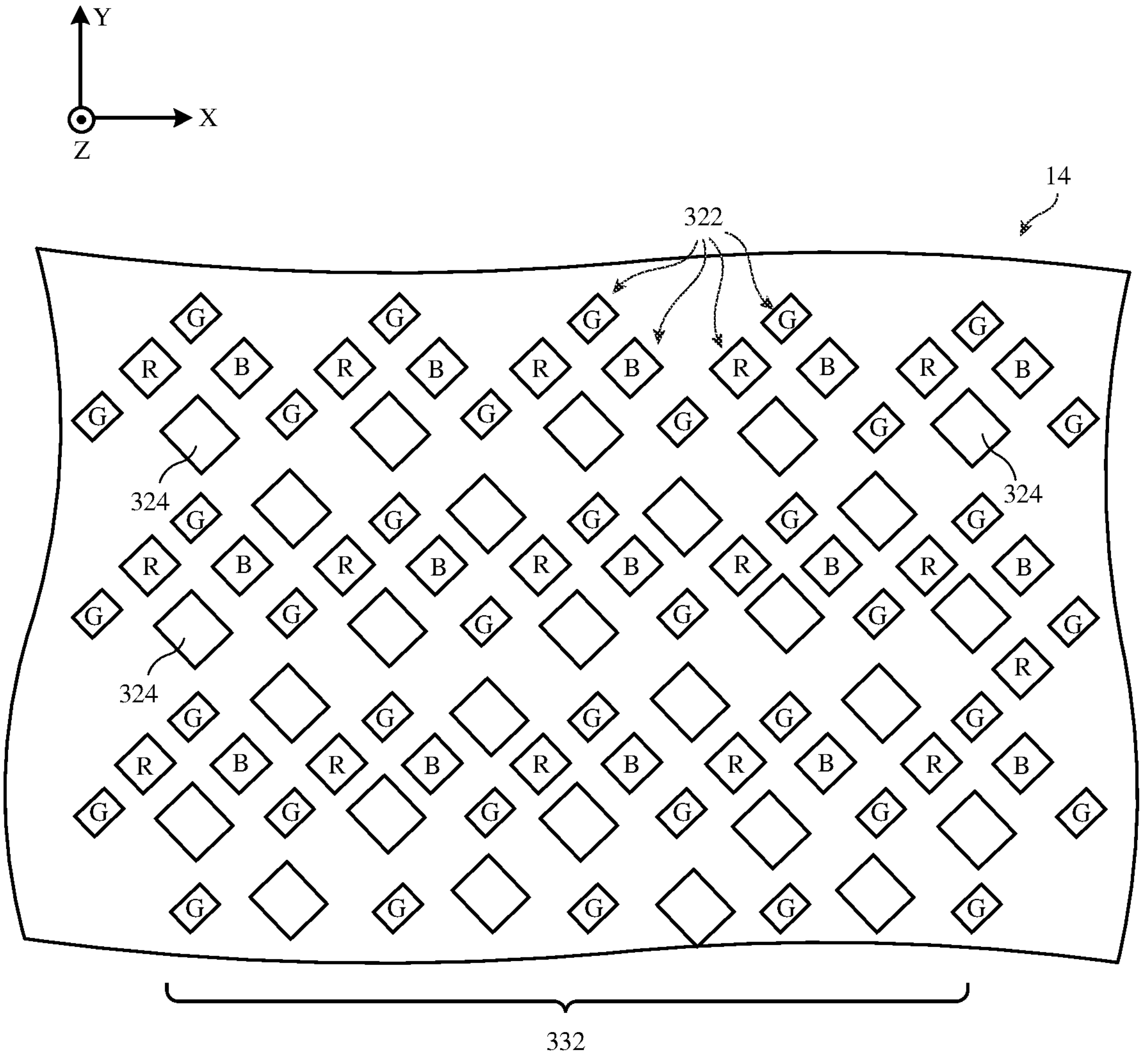
FIG. 5 is a top view of an illustrative display with transparent openings that overlap a sensor in accordance with an embodiment.

FIG. 5 is a top view of an illustrative display showing how a pixel removal region including a number of high-transmittance areas may be incorporated into the display. The pixel removal region 332 includes display pixel regions 322 and high-transmittance areas 324. As shown, the display may include a plurality of pixels. In FIG. 5, there are a plurality of red pixels (R), a plurality of blue pixels (B), and a plurality of green pixels (G). The red, blue, and green pixels may be arranged in any desired pattern. The red, blue, and green pixels occupy pixel regions 322. In high-transmittance areas 324, no pixels are included in the display (even though pixels would be present if the normal pixel pattern was followed).

As shown in FIG. 5, display 14 may include an array of high-transmittance areas 324. Each high-transmittance area 324 may have an increased transparency compared to pixel region 322. Therefore, the high-transmittance areas 324 may sometimes be referred to as transparent windows 324, transparent display windows 324, transparent openings 324, transparent display openings 324, etc. The transparent display windows may allow for light to be transmitted to an underlying sensor, as shown in FIGS. 3 and 4. The transparency of high-transmittance areas 324 (for visible and/or infrared light) may be greater than 25%, greater than 30%, greater than 40%, greater than 50%, greater than 60%, greater than 70%, greater than 80%, greater than 90%, etc. The transparency of transparent openings 324 may be greater than the transparency of pixel region 322. The transparency of pixel region 322 may be less than 25%, less than 20%, less than 10%, less than 5%, etc. The pixel region 322 may sometimes be referred to as opaque display region 322, opaque region 322, opaque footprint 322, etc. Opaque region 322 includes light emitting pixels R, G, and B, and blocks light from passing through the display to an underlying sensor 13.

The pattern of pixels (322) and transparent openings (324) in FIG. 5 is merely illustrative. In FIG. 5, the display edge may be parallel to the X axis or the Y axis. The front face of the display may be parallel to the XY plane such that a user of the device views the front face of the display in the Z direction. In FIG. 5, every other subpixel may be removed for each color. The resulting pixel configuration has 50% of the subpixels removed. In FIG. 5, the remaining pixels follow a zig-zag pattern across the display (with two green sub-pixels for every one red or blue sub-pixel). In FIG. 5, the sub-pixels are angled relative to the edges of the display (e.g., the edges of the sub-pixels are at non-zero, non-orthogonal angles relative to the X-axis and Y-axis). This example is merely illustrative. If desired, each individual subpixel may have edges parallel to the display edge, a different proportion of pixels may be removed for different colors, the remaining pixels may follow a different pattern, etc.

Figure 6A:
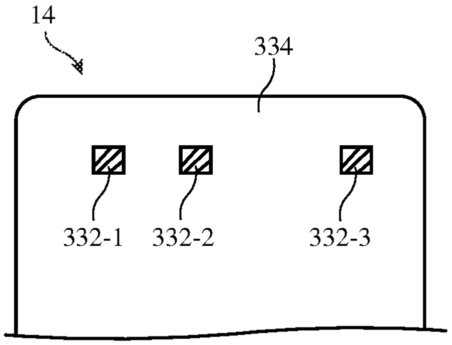
FIGS. 6A-6F are top views of illustrative displays showing possible positions for pixel removal regions in accordance with an embodiment.

In general, the display subpixels may be partially removed from any region(s) of display 14. FIGS. 6A-6F are front views showing how display 14 may have one or more localized pixel removal regions in which the pixels are selectively removed using the scheme of FIGS. 4 and 5. The example of FIG. 6A illustrates various local pixel removal regions 332 physically separated from one another (i.e., the various pixel removal regions 332 are non-continuous) by full pixel density region 334. The full pixel density region 334 does not include any transparent windows 324 (e.g., none of the sub-pixels are removed and the display follows the pixel pattern without modifications). The three pixel removal regions 332 in FIG. 6A might for example correspond to three different sensors formed underneath display 14 (with one sensor per pixel removal region).

Figure 6B:
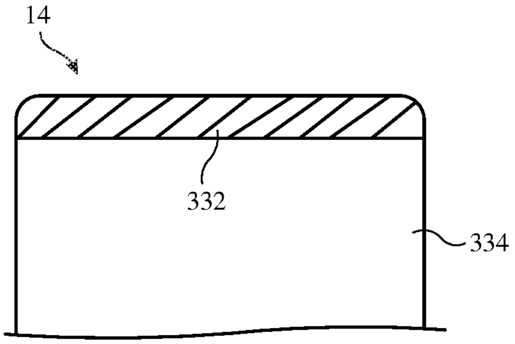
Figure 6C:
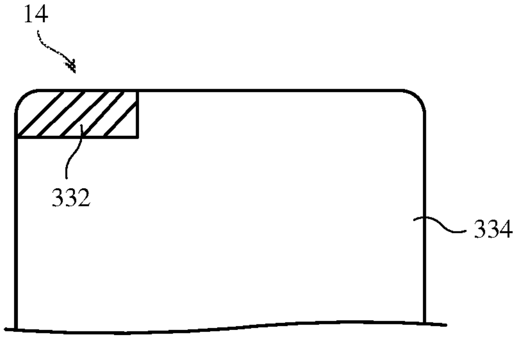
Figure 6D:
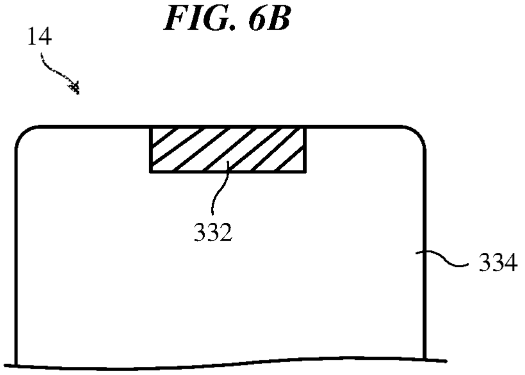
Figure 6E:
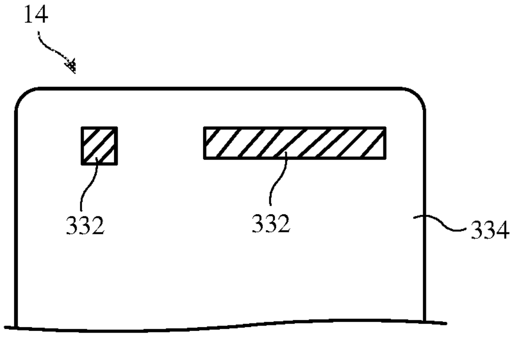
Figure 6F:
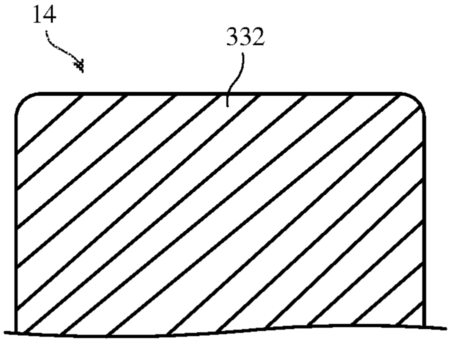

The example of FIG. 6B illustrates a continuous pixel removal region 332 formed along the top border of display 14, which might be suitable when there are many optical sensors positioned near the top edge of device 10. The example of FIG. 6C illustrates a pixel removal region 332 formed at a corner of display 14 (e.g., a rounded corner area of the display). In some arrangements, the corner of display 14 in which pixel removal region 332 is located may be a rounded corner (as in FIG. 6C) or a corner having a substantially 90° corner. The example of FIG. 6D illustrates a pixel removal region 332 formed only in the center portion along the top edge of device 10 (i.e., the pixel removal region covers a recessed notch area in the display). FIG. 6E illustrates another example in which pixel removal regions 332 can have different shapes and sizes. FIG. 6F illustrates yet another suitable example in which the pixel removal region covers the entire display surface. These examples are merely illustrative and are not intended to limit the scope of the present embodiments. If desired, any one or more portions of the display overlapping with optically based sensors or other sub-display electrical components may be designated as a pixel removal region/area.

Figure 7:
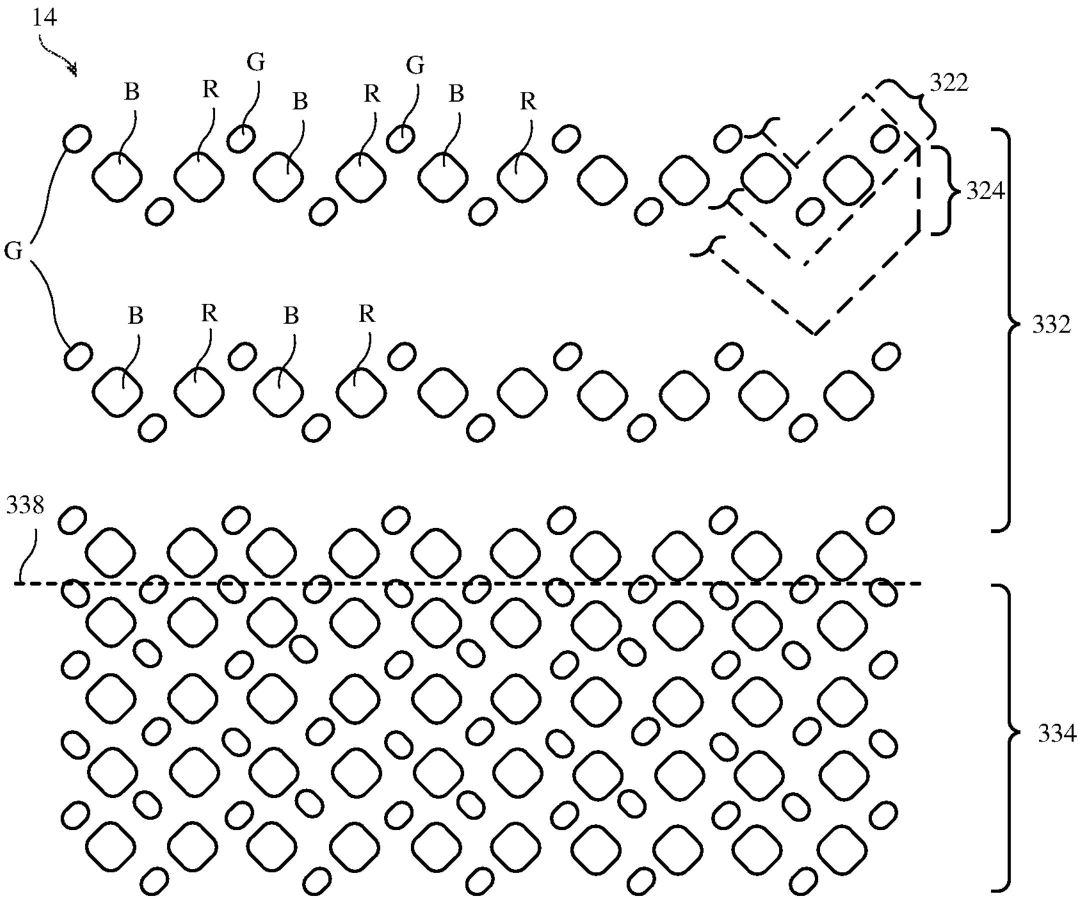
FIG. 7 is a top view of an illustrative display showing the boundary between a pixel removal region and a full pixel density region in accordance with an embodiment.

FIG. 7 is a top view of an illustrative display with a pixel removal region. As shown, there is a border 338 between pixel removal region 332 and full pixel density region 334 (sometimes referred to as normal region 334). Ideally, it would be desirable for pixel removal region 332 and normal region 334 to have the same appearance to the viewer and for the border between pixel removal region 332 and normal region 334 to be imperceptible to the viewer. With this type of arrangement, content may be displayed in pixel removal region 332 and normal region 334 for the user while a sensor underneath pixel removal region 332 simultaneously obtains sensor data through the windows 324.

Because pixel removal region 332 includes both pixel regions 322 and transparent windows 324, the pixel density (e.g., the number of sub-pixels per unit area) in pixel region 332 is reduced relative to full pixel density region 334. In general, the pixel density in pixel removal region 332 may be reduced by any desired amount relative to the pixel density in region 334 (e.g., reduced by 5% or more, reduced by 10% or more, reduced by 25% or more, reduced by 50% or more, reduced by between 10% and 60%, reduced by between 30% and 60%, reduced by between 40% and 60%, etc.). In FIG. 7, the pixel density in pixel removal region 332 is reduced by 50% relative to the pixel density in region 334. In other words, the pixel density in region 332 is half of the pixel density of region 334. This configuration may be used as an example for subsequent descriptions.

For the border between pixel removal region 332 and full pixel density region 334 to be imperceptible to the viewer, the pixels in pixel removal region 332 may be brighter than the pixels in full pixel density region 334. Consider the example where all the pixels in FIG. 7 (in both regions 332 and 334) emit light at the same brightness. In this example, because the pixel density in region 332 is half of the pixel density as in region 334, the overall perceived brightness of region 332 may be approximately half of the overall perceived brightness of region 334. To equalize the brightness between the regions, the pixels in region 332 may emit light at a brightness that is twice the brightness of pixels in region 334. This may compensate for the reduced pixel density in region 332 to help mitigate brightness differences between regions 332 and 334. However, simply doubling the brightness in region 332 to account for the pixel density difference may still result in a perceptible border between regions 332 and 334 (due to additional differences between the pixels in regions 332 and 334 such as differences in pixel gamma, brightness, color uniformity, etc.). Additional steps may therefore be taken to ensure uniformity between pixel removal region 332 and full pixel density region 334.

Figure 8:
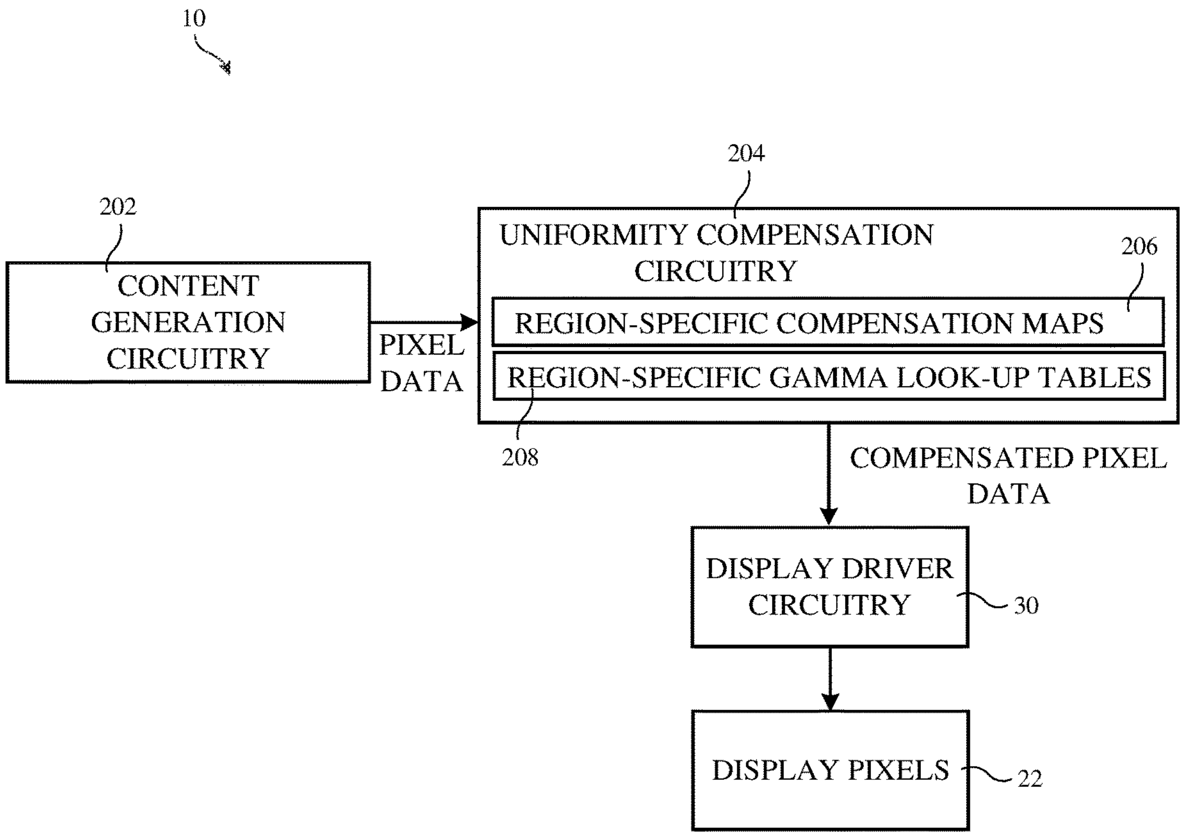
FIG. 8 is a schematic diagram of an illustrative electronic device that includes uniformity compensation circuitry for mitigating the visibility of a boundary between a pixel removal region and a full pixel density region in accordance with an embodiment.

FIG. 8 is a schematic diagram of an illustrative electronic device that includes uniformity compensation circuitry configured to compensate for the presence of pixel removal region 332 such that the pixel removal region 332 is imperceptible to the viewer. First, content generation circuitry 202 may render content for the display. The rendered content may include an array of pixel data, with a target luminance value (gray level) for each sub-pixel in the display. It should be noted that sub-pixel may refer to a specific light-emitting pixel of a given color (e.g., a red sub-pixel, green sub-pixel, a blue sub-pixel etc.). The term pixel may sometimes be used to refer to a group of sub-pixels or may sometimes be used as a synonym for sub-pixel. The content generating circuitry may generate content based on software running on control circuitry 16, based on input from one or more input devices 12 in electronic device 10, etc.

Ultimately, content generation circuitry 202 may output pixel data for a given frame. The pixel data may include a target luminance value (gray level) for each sub-pixel in the display for the frame.

As previously discussed, without additional compensation, unmodified pixel data displayed on the display may result in undesired borders or differing appearances between pixel removal region 332 and normal region 334. Therefore, device 10 includes uniformity compensation circuitry 204 that is configured to adjust the pixel data to account for the varying pixel density between the pixel removal region 332 and the normal pixel region 334. Uniformity compensation circuitry 204 may match the uniformity and pixel gamma between regions 332 and 334 and use content transition to make the boundary between regions 332 and 334 imperceptible to the viewer.

First, the uniformity-compensation circuitry 204 may include region-specific compensation maps 206. The compensation maps 206 may determine a corrected gray level for a given sub-pixel based on the location of that sub-pixel and other possible factors. For example, a first pixel at the boundary between pixel removal region 332 and normal pixel region 334 may have an associated first compensation value, a second pixel in pixel removal region 332 that is not adjacent to the boundary may have an associated second compensation value, and a third pixel in normal region 334 that is not adjacent to the boundary may have an associated third compensation value.

The compensation maps are therefore used to adjust a gray level for a given sub-pixel based on the position of the sub-pixel. The compensation maps may optionally use the gray levels of one or more adjacent sub-pixels in determining compensation for a given sub-pixel. The compensation maps may take other factors into account such as the ambient light level (e.g., obtained by an ambient light sensor in the electronic device), a display brightness setting (e.g., set by the user or based on other considerations such as power consumption considerations), a temperature (e.g., obtained by a temperature sensor in the electronic device), etc. Based on these inputs, the initial gray levels from content generation circuitry 202, and the location of the corresponding sub-pixel, compensation maps 206 may output a compensated gray level for each sub-pixel.

The compensation maps may include binning of compensation values to mitigate memory requirements. The granularity (resolution) of the compensation maps may vary or may be constant across the compensation map. In general, granularity may increase as the pixel location nears the boundary 338 between regions 332 and 334. Sub-pixels at (or very close to) boundary 338 may have the highest granularity within the compensation map. For example, each sub-pixel may have a unique compensation value in this area. In contrast, compensation values may be binned for sub-pixels further from the boundary. A single compensation value may be stored in the compensation map to apply to a binned group of two sub-pixels, four sub-pixels, sixteen sub-pixels, more than two sub-pixels, more than four sub-pixels, more than eight sub-pixels, more than ten sub-pixels, more than twenty sub-pixels, more than forty sub-pixels, etc. The binned groups of sub-pixels may include 2×2 groups of sub-pixels, 4×4 groups of sub-pixels, or groups of any other desired dimensions.

It should be noted that a single compensation map may be used for the entire display or multiple compensation maps may be used for different portions of the display. For example, pixel removal region 332 may have a compensation map, full pixel density region 334 may have a compensation map, and a boundary region between pixel removal region 332 and full pixel density 334 may have a compensation map. Multiple compensation maps may also be included to account for the additional factors mentioned above (ambient light level, display brightness setting, temperature, etc.).

Figure 9:
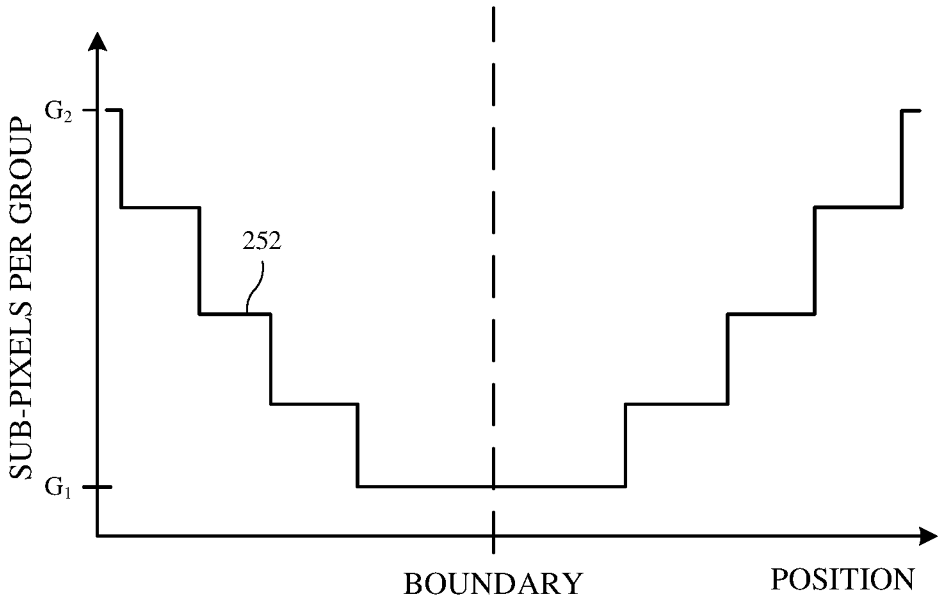
FIG. 9 is a graph showing how the binning size in an illustrative compensation map may vary in accordance with an embodiment.

FIG. 9 is a graph showing how the granularity (resolution) of the compensation map may vary across the compensation map. FIG. 9 shows an illustrative profile 252 for the number of sub-pixels per group in the compensation map as a function of position within the compensation map. Granularity may be considered inversely proportional to the number of sub-pixels per group (e.g., a low number of sub-pixels per group corresponds to a high granularity and a high number of sub-pixels per group corresponds to a low granularity). As shown, the compensation map may have a maximum granularity $G_1$ (e.g., a minimum number of sub-pixels per group) at a region that includes the boundary (e.g., boundary 338 between regions 332 and 334). As the distance from the boundary increases, the granularity decreases and the number of sub-pixels per group in the compensation map increases to eventually reach a minimum granularity $G_2$. $G_1$ may be, for example, equal to 1, 2, 3, 4, or some other desired value. The profile of FIG. 9 is merely illustrative. If desired, profile 252 may be asymmetrical. In general, profile 252 may have any desired shape.

In the example of FIG. 9, the granularity follows a step function and has five discrete granularities (e.g., five different pixels that are different distances from the boundary may be part of binning groups having five different sizes). This example is merely illustrative. In general, a given compensation map may include any desired number of different binning sizes (granularities). The transition between different binning sizes may be approximately smooth or may follow a step function as in FIG. 9. Each zone of a given binning size may have any desired size. For example, sub-pixels that are within 5 columns of the boundary, within 10 columns of the boundary, within 30 columns of the boundary, or some other desired distance from the boundary may have the maximum granularity.

After compensation map 206 compensates the gray levels, region-specific gamma look-up tables 208 may be used to obtain values that will ultimately be provided to the display. The region-specific look-up tables 208 may include a plurality of look-up tables representing gamma curves. Gamma curves are used to map luminance levels (e.g., gray levels) for each pixel to corresponding voltage levels (e.g., voltages applied to the pixels using display driver circuitry). Gamma curves may account for the non-linear manner in which viewers perceive light and color. A gamma look-up table may include a table of output voltages that each correspond to a particular input (e.g., gray level). The gamma look-up table may output a voltage for a given sub-pixel based on the input gray level for that sub-pixel.

Due to the different gamma behavior of pixels in pixel removal region 332 and full pixel density region 334, pixels in different regions may have different associated gamma look-up tables. For example, a first gamma look-up table (representing a first gamma curve) may be used for pixels in pixel removal region 332. A second, different gamma look-up table (representing a second gamma curve that is different than the first gamma curve) may be used for pixels in full pixel density region 334. The same gray level input may have different associated outputs from the first and second gamma look-up tables. If desired, additional look-up tables may be used for additional regions of the display (e.g., different pixel removal regions may have different associated look-up tables, a boundary region may have a specific look-up table, etc.).

The uniformity compensation circuitry 204 may use region-specific compensation maps 206 and region-specific gamma look-up tables 208 to produce compensated pixel data in any desired manner. For example, the use of region-specific compensation maps 206 and region-specific gamma look-up tables 208 may be sequential. In one example, region-specific compensation maps 206 may be used to compensate the gray levels of the pixel data and region-specific gamma look-up tables 208 may subsequently be used to convert the compensated gray levels into voltages for the compensated pixel data. In another example, region-specific gamma look-up tables 208 may convert the gray levels from the pixel data into voltages which are then subsequently compensated using region-specific compensation maps 206 to produce the compensated pixel data. In yet another example, the region-specific compensation maps 206 and region-specific gamma look-up tables 208 may be used in parallel (e.g., the region-specific compensation maps 206 may be used to compensate the region-specific gamma look-up tables 208 and the pixel data is converted to compensated pixel data in one step).

Ultimately, uniformity compensation circuitry 204 outputs compensated pixel data for the display pixels based on input pixel data (e.g., gray levels). The uniformity compensation circuitry may use one or more region-specific compensation maps and one or more region-specific gamma look-up tables to convert the input pixel data into compensated pixel data. The uniformity compensation circuitry may use other inputs (e.g., ambient light level, display brightness setting, temperature, gray levels of sub-pixels adjacent to a target sub-pixel, etc.) to convert the input pixel data into compensated pixel data. The compensated pixel data may be provided by uniformity compensation circuitry 204 to display driver circuitry 30. The display driver circuitry 30 provides the compensated pixel data to the display pixels 22, which emit light based on the received compensated pixel data.

Figure 10:
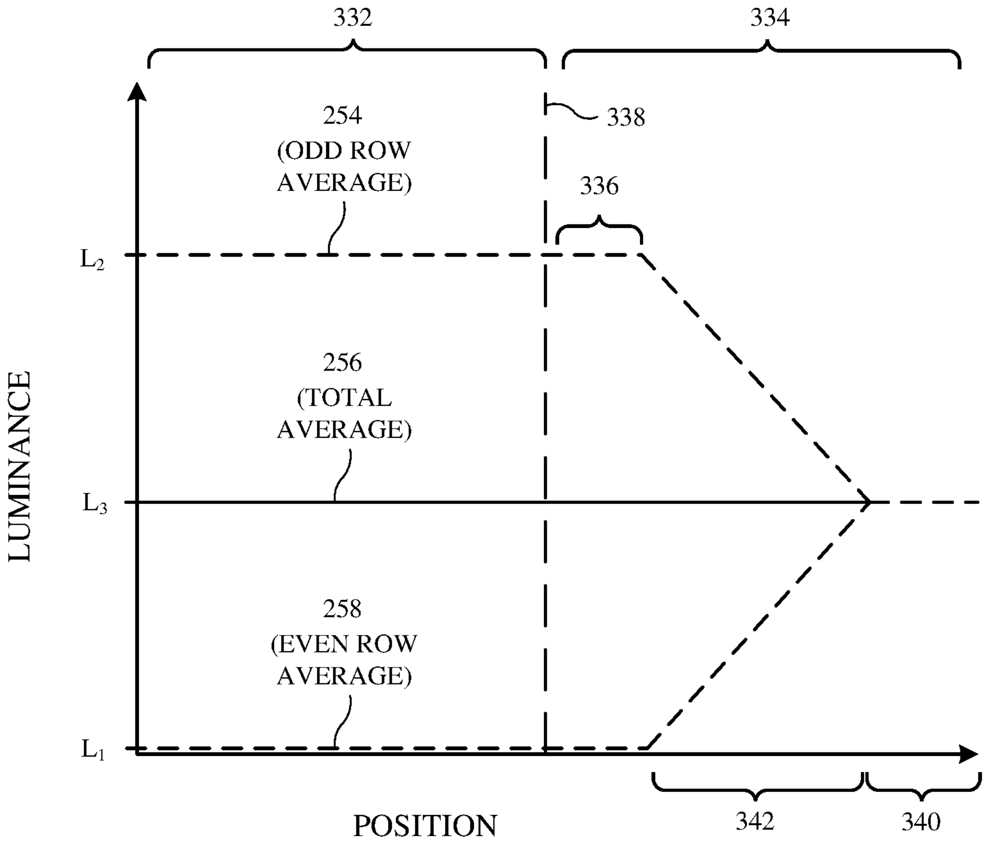
FIG. 10 is a graph showing how an illustrative display may include a transition region adjacent to a boundary between a pixel removal region and a full pixel density region in accordance with an embodiment.

If desired, a brightness transition may be used to seamlessly blend the boundary between pixel removal region 332 and full pixel density region 334 (thus mitigating the visibility of the boundary). FIG. 10 is a graph of luminance versus position for different pixels in the display showing an example of this type.

As shown in FIG. 10, the display includes pixels in pixel removal region 332 and pixels in full pixel density region 334. There is a physical boundary 338 where the pixel density switches from the full density of region 334 to the reduced density of region 332. In one example, every other row of pixels is removed in pixel removal region 332 (e.g., in place of transparent windows 324 as in FIGS. 4, 5, and 7). In this example, the even rows of pixels are removed and the odd rows of pixels are present in pixel removal region 332. Both the even and odd rows of pixels are present in full pixel density region 332. To generalize, the pixels may be arranged according to a pattern. In pixel removal region 332, pixels are present in a first portion of the pattern (e.g., the odd rows in FIG. 10) and omitted in a second portion of the pattern (e.g., the even rows in FIG. 10). In full pixel density region 334, pixels are present in both the first and second portions of the pattern.

Profile 254 shows the average luminance of the odd rows as a function of position within the display. Profile 258 shows the average luminance of the even rows as a function of position within the display. Profile 256 shows the average total luminance of both the even rows and odd rows as a function of position within the display. It should be noted that luminance as discussed in connection with FIG. 10 may refer to the maximum luminance for the given pixels. Content displayed in real time may use luminance values that are less than the maximum luminance. However, examining maximum luminance is indicative of how the luminance transition occurs.

Since the even rows in region 332 are removed and cannot emit light, the even rows have an average luminance of $L_1$ (e.g., 0 or off) in pixel removal region 332 (as shown by profile 258). The odd rows have an average luminance of $L_2$ in pixel removal region 332. The total average luminance in pixel removal region 332 is therefore $L_3$ (e.g., approximately half of $L_2$).

This luminance scheme may be held throughout pixel removal region 332, even as the pixels approach boundary 338 between pixel removal region 332 and full pixel density region 338. At boundary region 338, full pixel density region 334 begins. At this point, (e.g., to the right of boundary 338 in FIG. 10), the display is capable of displaying content on all of the pixels in full pixel density region.

Consider region 340 of full pixel density region 334. Region 340 (sometimes referred to as normal display region 340, uniform luminance region 340, etc.) may be separated from boundary 338 by a given distance. Region 340 may display content 'normally.' In other words, both the odd rows and even rows may operate with the same average luminance (e.g., $L_3$ in FIG. 10). The total average luminance is therefore the same as the odd row average and the even row average in region 340.

Full pixel density region 334 has full pixel density up to the boundary 338. Therefore, the normal display scheme in region 340 could, if desired, be used in all of full pixel density region 334 (including immediately adjacent to boundary 338). However, this may result in a perceptible border between the full pixel density region 334 and pixel removal region 332. The display may therefore include a transition region 342 between boundary 338 and normal region 340.

Transition region 342 may be used to gradually transition the luminance distribution from fully one-sided (e.g., 100% of the luminance comes from odd rows) in region 332 to fully mixed (e.g., 50% of the luminance comes from odd rows and 50% from even rows) in region 340. This gradual transition in the distribution of luminance between odd rows (e.g., the first portion of the pattern) and even rows (e.g., the second portion of the pattern) may mitigate the visibility of the boundary between the pixel removal region 332 and full pixel density region 334. The gradual luminance transition effectively imitates a gradual transition in pixel density between the reduced pixel density of region 332 and the full pixel density of region 334. For this reason, region 342 may sometimes be referred to as a pixel density transition region.

As shown in FIG. 10, the average odd row luminance 254 gradually drops from $L_2$ (on a first side of the transition region closer to the boundary) to $L_3$ (on a second side of the transition region closer to normal region 340) across transition region 342 of the display. There may be one or more intermediate average luminance levels between $L_2$ and $L_3$. Meanwhile the average even row luminance 258 increases from $L_1$ (on a first side of the transition region closer to the boundary) to $L_3$ (on a second side of the transition region closer to normal region 340) across transition region 342 of the display. The slope of profile 254 in region 342 has the same magnitude but opposite sign as the slope of profile 258 in region 342. In other words, the luminance of the odd rows (e.g., the first portion of the pixel pattern) drops at the same rate the luminance of the even rows (e.g., the second portion of the pixel pattern) increases. In this way, the total average luminance for the display remains the same through transition region 342, as shown by profile 256 in FIG. 10.

The display may also include buffer region 336 between boundary 338 and transition region 342. In buffer region 336, the luminance profile of the pixel removal region 332 is maintained (e.g., 100% of the luminance comes from odd rows) even though the display has the physical capability to emit light in the even rows in this region. The buffer region may reduce the perceptibility of the boundary between pixel removal region 332 and full pixel density region 334. In some cases, however, the buffer region may be omitted. In these cases, transition region 342 may start immediately at the boundary between regions 332 and 334.

The width of buffer region 336 may be less than thirty columns (of sub-pixels), less than twenty-five columns, less than twenty columns, less than ten columns, less than five columns, zero columns (when the buffer region is omitted entirely), more than five columns, more than ten columns, more than twenty columns, between twenty and forty columns, etc. The width of transition region 342 may be less than one hundred columns, less than seventy-five columns, less than sixty columns, less than fifty columns, less than forty columns, less than thirty columns, less than twenty columns, less than ten columns, less than five columns, more than five columns, more than ten columns, more than twenty columns, more than forty columns, more than fifty columns, more than sixty columns, between thirty and one hundred columns, etc.

Uniformity compensation circuitry 204 in FIG. 8 may be used to implement the transition region shown in FIG. 10 (e.g., using the compensation maps 206 and/or gamma look-up tables 208).

Figure 11:
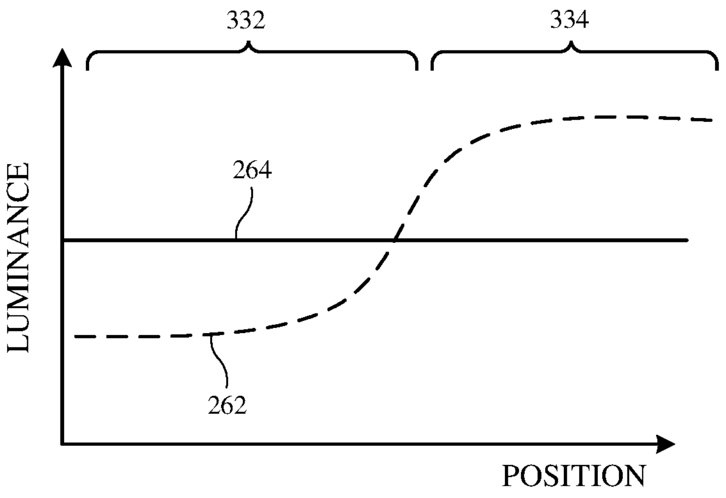
FIG. 11 is a graph showing how the uniformity compensation circuitry may compensate pixel data such that the average luminance between a pixel removal region and a full pixel density region remains relatively constant in accordance with an embodiment.

FIG. 11 is a graph showing how the uniformity compensation circuitry 204 may increase the uniformity of the display at the boundary between pixel removal region 332 and full pixel density region 334. As shown in FIG. 11, without uniformity compensation circuitry 204, the average display luminance may follow a profile 262 that varies across the boundary between regions 332 and 334. In contrast, with uniformity compensation circuitry 204, the average display luminance may follow a profile 264 that remains relatively constant across the boundary between regions 332 and 334. Profile 264 may have some small amount of variation in luminance. However, the variation in luminance may be sufficiently small so as to be imperceptible to a viewer of the display.

It should be noted that content generating circuitry 202, uniformity compensation circuitry 204, and display driver circuitry 30 may be implemented using one or more microprocessors, microcontrollers, digital signal processors, graphics processing units, application-specific integrated circuits, and other integrated circuits. Content generating circuitry 202, uniformity compensation circuitry 204, and display driver circuitry 30 may sometimes be referred to as part of display 14 and/or may sometimes be referred to as control circuitry (e.g., part of control circuitry 16 in FIG. 1).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:

a display having an array of pixels, wherein the display comprises:

a full pixel density portion with a first pixel density, wherein the full pixel density portion has a normal region and a transition region; and a pixel removal portion with a second pixel density that is less than the first pixel density, wherein the transition region is between the normal region and the pixel removal portion, and wherein the total average maximum luminance of the normal region, the transition region, and the pixel removal portion are equal.

2. The electronic device defined in claim 1, wherein the electronic device further comprises:

a sensor that senses light that passes through the pixel removal portion of the display.

3. The electronic device defined in claim 1, wherein a first pixel in the full pixel density portion has a first maximum luminance, wherein a second pixel in the pixel removal portion has a second maximum luminance, and wherein the second maximum luminance is greater than the first maximum luminance.

4. The electronic device defined in claim 1, wherein a first pixel in the transition region has a first maximum luminance, wherein a second pixel in the transition region has a second maximum luminance, wherein the first pixel is closer to the normal region than the second pixel, and wherein the second maximum luminance is greater than the first maximum luminance.

5. The electronic device defined in claim 4, wherein a third pixel in the transition region has a third maximum luminance, wherein a fourth pixel in the transition region has a fourth maximum luminance, wherein the third pixel is closer to the normal region than the fourth pixel, and wherein the fourth maximum luminance is less than the third maximum luminance.

6. The electronic device defined in claim 5, wherein the first and second pixels are in a first row of the array of pixels and wherein the third and fourth pixels are in a second row of the array of pixels.

7. The electronic device defined in claim 6, wherein the first row is an odd row of the array of pixels and wherein the second row is an even row of the array of pixels.

8. The electronic device defined in claim 1, wherein a plurality of pixels in a first row of the array of pixels are off in the full pixel density portion and removed in the pixel removal portion.

9. The electronic device defined in claim 1, wherein the array of pixels is arranged according to a pattern, wherein pixels are omitted in a first portion of the pattern in the pixel removal portion of the display, and wherein pixels remain in a second portion of the pattern in the pixel removal portion of the display.

10. The electronic device defined in claim 9, wherein the maximum luminance of pixels in the first portion of the pattern is gradually increased from a first side of the transition region to a second side of the transition region, and wherein the maximum luminance of pixels in the second portion of the pattern is gradually decreased from the first side of the transition region to the second side of the transition region.

11. An electronic device, comprising:

a display having an array of pixels, wherein the display comprises:

a full pixel density portion with a first pixel density, wherein the full pixel density portion comprises a normal region and a buffer region; and a pixel removal portion with a second pixel density that is less than the first pixel density, wherein the buffer region is between the pixel removal portion and the normal region, wherein a row of pixels is off in the buffer region and removed in the pixel removal portion, and wherein an additional row of pixels has a first maximum luminance in the normal region and a second maximum luminance that is greater than the first maximum luminance in the buffer region.

12. The electronic device defined in claim 11, wherein half of the rows of pixels in the buffer region are off.

13. The electronic device defined in claim 11, wherein the row of pixels is an even row and the additional row of pixels is an odd row.

14. The electronic device defined in claim 11, wherein the total average maximum luminance of the full pixel density portion and the pixel removal portion are equal.

15. An electronic device, comprising:

a display having an array of pixels, wherein the display comprises:

a full pixel density portion with a first pixel density, wherein the full pixel density portion comprises a normal region, a transition region, and a buffer region, wherein the transition region is interposed between the normal region and the buffer region, wherein a first pixel in the buffer region has a first maximum luminance, wherein a second pixel in the transition region has a second maximum luminance, wherein a third pixel in the normal region has a third maximum luminance, wherein the first maximum luminance is zero, wherein the second maximum luminance is greater than the first maximum luminance, and wherein the third maximum luminance is greater than the second maximum luminance; and a pixel removal portion with a second pixel density that is less than the first pixel density, wherein the buffer region is between the pixel removal portion and the transition region.

16. The electronic device defined in claim 15, wherein the first, second, and third pixels are in a given row of the array of pixels.

17. The electronic device defined in claim 16, wherein a fourth pixel in the given row of the array of pixels in the pixel removal portion is removed.

18. The electronic device defined in claim 15, wherein a fourth pixel in the buffer region has a fourth maximum luminance, wherein a fifth pixel in the transition region has a fifth maximum luminance, wherein a sixth pixel in the normal region has a sixth maximum luminance, wherein the fifth maximum luminance is less than the fourth maximum luminance, and wherein the sixth maximum luminance is less than the fifth maximum luminance.

19. The electronic device defined in claim 18, wherein the fourth, fifth, and sixth pixels are in an additional row of the array of pixels.

20. The electronic device defined in claim 15, wherein the total average maximum luminance of the full pixel density portion and the pixel removal portion are equal.

* * * * *